United States Patent
Minemier (12)

(10) Patent No.: US 7,509,541 B2
(45) Date of Patent: Mar. 24, 2009

(54) DETECTION MECHANISM

(75) Inventor: Ronald K. Minemier, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1020 days.

(21) Appl. No.: 10/875,871

(22) Filed: Jun. 24, 2004

(65) Prior Publication Data

US 2006/0010346 A1   Jan. 12, 2006

(51) Int. Cl.
*G06F 11/00* (2006.01)
*H01L 27/108* (2006.01)
(52) U.S. Cl. ................. 714/704; 257/297; 257/428
(58) Field of Classification Search ........... 714/704; 257/297, 428
See application file for complete search history.

(56) References Cited

U.S. PATENT DOCUMENTS

| 5,022,027 A | 6/1991 | Rosario |
| 5,604,755 A | 2/1997 | Bertin et al. |
| 2003/0234430 A1 | 12/2003 | Friend et al. |
| 2004/0061060 A1 | 4/2004 | Layman et al. |

FOREIGN PATENT DOCUMENTS

| EP | 0 919 913 A | 6/1999 |
| GB | 2 279 780 A | 1/1995 |
| WO | WO 02/29437 A | 4/2002 |
| WO | WO 2004/073326 | 8/2004 |

OTHER PUBLICATIONS

PCT Written Opinion, PCT/US2005/020142, mailed Nov. 30, 2005, pp. 1-6.*
Patent Abstracts of Japan vol. 012, No. 249 (P-730), Jul. 14, 1988-& JP63040892A (Makoto Morimoto; others: 01), Feb. 22, 1988.
Chou H P et al; "Evaluation of High Density DRAMs as a Nuclear Radiation Detector" Applied Radiation and Isotopes, Pergamon Press Ltd., Exeter, GB, vol. 48, No. 10-12, Oct. 12, 1997, pp. 1601-1604, XP004101757 ISSN:0969-8043.
Schroder O et al; "The application of commercial semiconductor chips for personal neutron dosimetry" Advances in Radiation Measurements: Applications and Research needs in Helth Physics and Dosimetry Oct. 3-6, 1994 Chalk River, Ont., Canada, vol. 61, No. 1-3, 1995, pp. 9-12, XP009056435 Radiation Protection Dosimetry UK.
PCT Search Report, PCT/US2005/020142, mailed Nov. 30, 2005.
Patent Abstracts of Japan, "Radiation Detector", JP63040892, Feb. 22, 1988.
Chou et al., "Evaluation of High Density DRAMs as a Nuclear Radiation Detector", Applied Radiation and Isotopes, vol. 48, No. 10-12, pp. 1601-1604, 1997.
Shroder et al. "The Application of Commercial Semiconductor Chips for Personal Neutron Dosimetry", Radiotion Protection Disometry, vol. 61, No. 1-3, pp. 9-12, 1995.

* cited by examiner

*Primary Examiner*—Jacques Louis-Jacques
*Assistant Examiner*—John J Tabone, Jr.
(74) *Attorney, Agent, or Firm*—Blakely, Sokoloff, Taylor & Zafman LLP

(57) ABSTRACT

A computer apparatus includes a first integrated circuit (IC) and a second IC. The second IC includes a soft error rate (SER) immune component and a SER component to detect radiation that could result in soft errors at logic at the first IC.

13 Claims, 3 Drawing Sheets

DETECTION MECHANISM

FIELD OF THE INVENTION

The present invention relates to integrated circuits; more particularly, the present invention relates to the detection of soft errors in integrated circuits.

BACKGROUND

Currently, expensive radiation detectors are required to detect ambient radiation. These radiation detectors are constructed using Geiger-Mueller tubes. These tubes are quite fragile, and thus are easily broken. Moreover, the radiation detectors are relatively large and consume a large magnitude of power. Therefore, the detectors are not portable.

In the world of integrated circuits (ICs), transistors have sizes in the sub-micron range. Such small transistors are more sensitive to cosmic (neutrons) and alpha particle strikes. Consequently, particle hits to the silicon on which the transistors are fabricated can literally change the state of the transistor. For example, a latch holding a 0 value may be changed to a 1 value. This phenomenon is referred to as soft error.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A mechanism for detecting radiation is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
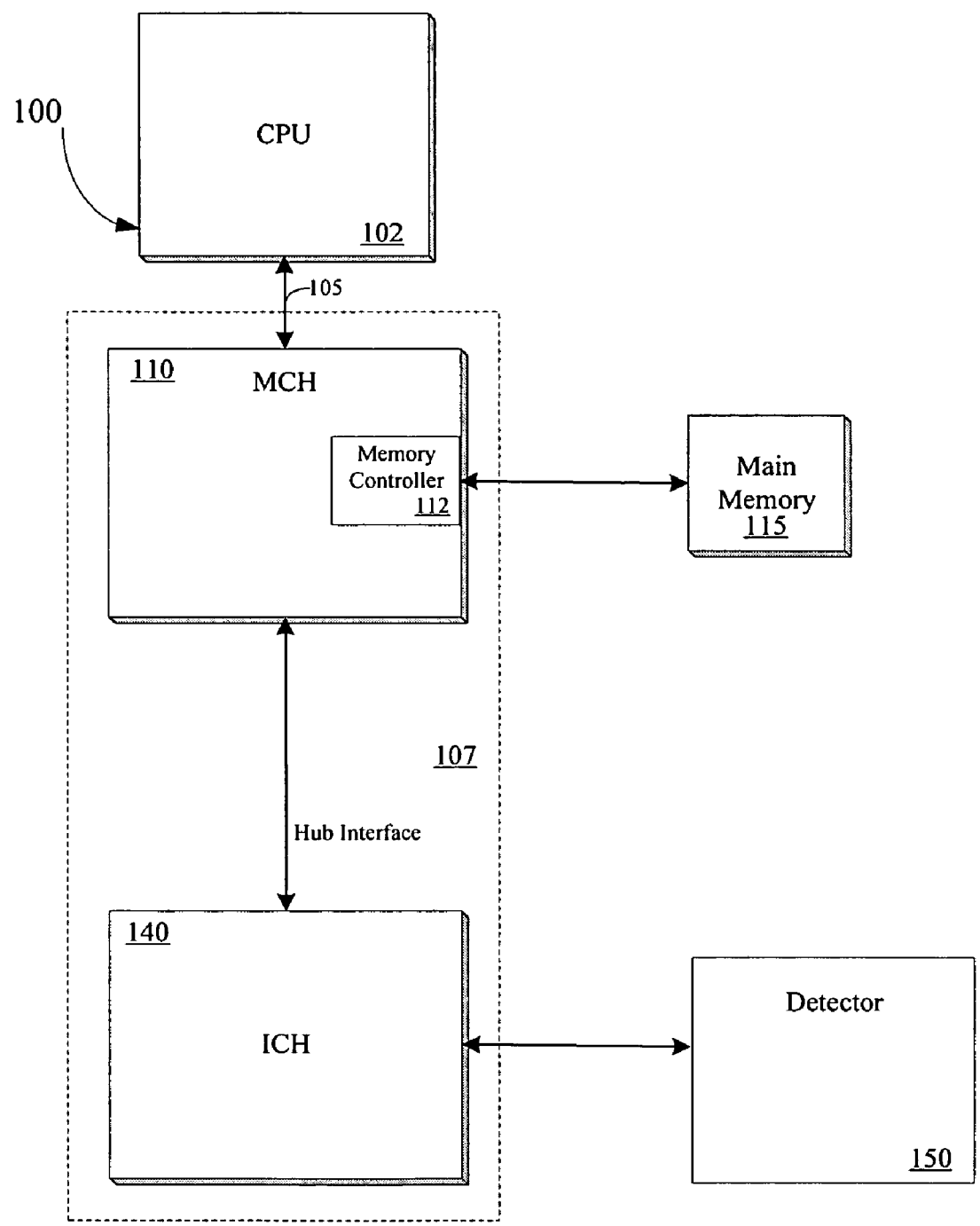
FIG. 1 illustrates one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

According to one embodiment, bus 105 is a front side bus (FSB) that communicates with a memory control hub (MCH) 110 component of a chipset 107. MCH 110 includes a memory controller 112 that is coupled to a main system memory 115. Main system memory 115 stores data and sequences of instructions and code represented by data signals that may be executed by CPU 102 or any other device included in system 100. In one embodiment, main system memory 115 includes dynamic random access memory (DRAM); however, main system memory 115 may be implemented using other memory types.

According to one embodiment, MCH 110 is coupled to an input/output control hub (ICH) 140 via a hub interface. ICH 140 provides an interface to input/output (I/O) devices within computer system 100. For instance, ICH 140 may be coupled to a detector 150. In one embodiment, detector 150 is coupled to ICH 140 via a serial link. However, one of ordinary skill in the art will appreciate that other links (e.g., optical, flip-chip, die-stack, etc.) may be implemented.

Figure 2:
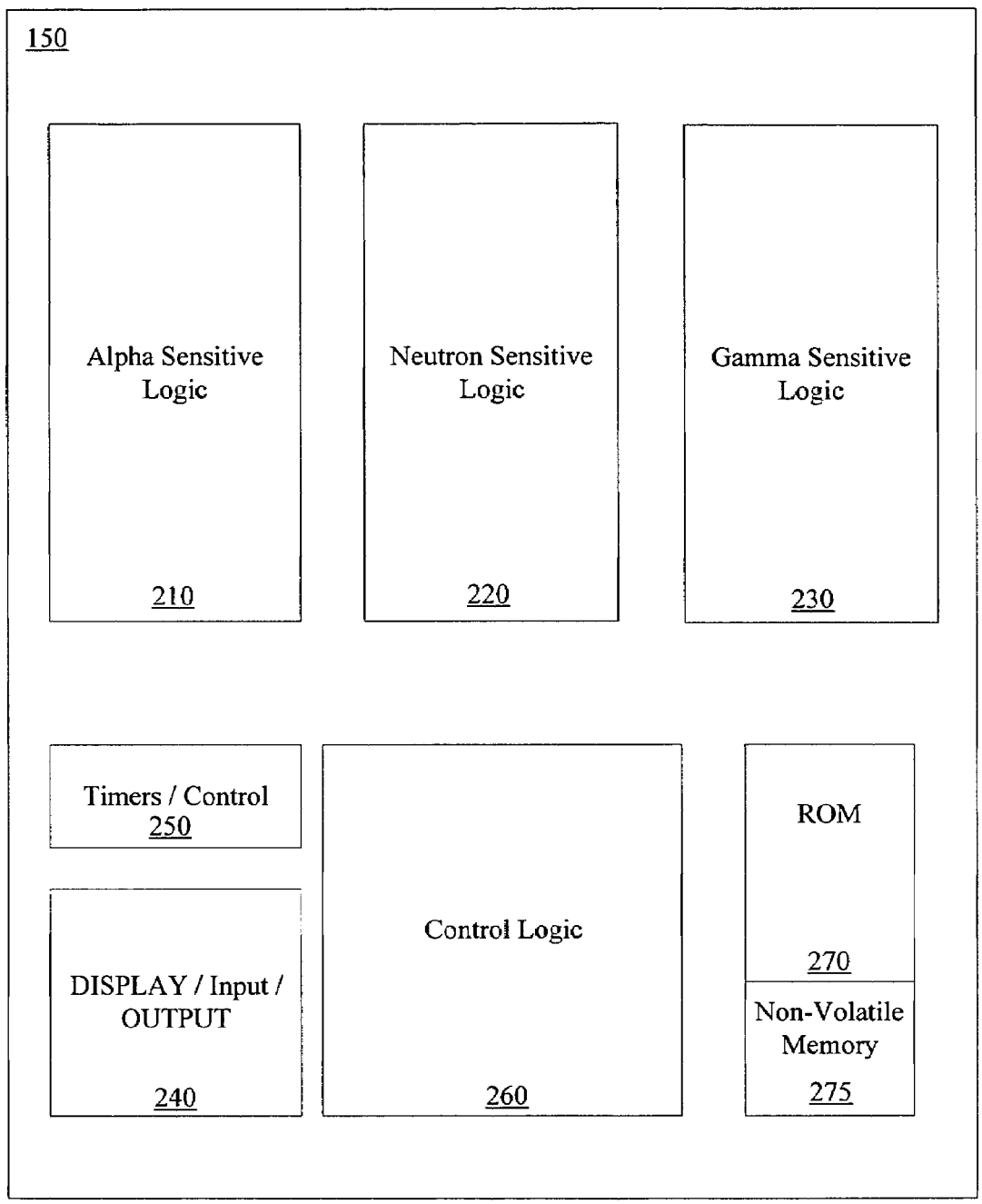
FIG. 2 illustrates one embodiment of a radiation detector.

According to one embodiment, detector 150 detects radiation conditions within computer system 100 that may lead to soft error at ICs within computer system 100. Particularly, detector 150 may detect various levels of radiation (e.g., alpha, neutron and gamma particle types). FIG. 2 illustrates a block diagram of one embodiment of detector 150.

Referring to FIG. 2, detector 150 includes logic arrays 210 and 220. In one embodiment, logic arrays 210 and 220 are designed to have a significant soft error rate (SER). Normally modern semiconductor structures are designed to be immune to SER. Thus, careful design techniques are used to absorb random alpha particle or neutron strikes and not flip logic states or memory states. However, for detector 150 the opposite is done. Logic arrays 210 and 220 change states if alpha and neutron particles, respectively, strike the diffusion regions.

Figure 3:
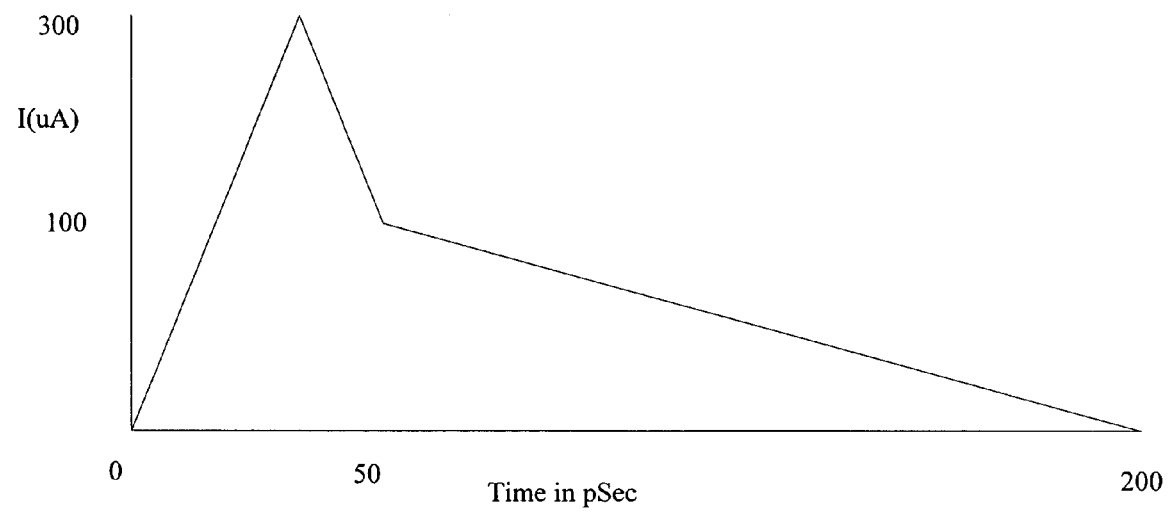
FIG. 3 illustrates a graph of one embodiment of a typical Alpha strike.
Figure 4:
FIG. 4 illustrates a graph of one embodiment of a typical Neutron strike.

Alpha and neutron strikes have different energy transfer profiles in a semiconductor. Logic 210 and 220 take advantage of these separate profiles by being designed to be more sensitive to one type of strike as opposed to the other. FIG. 3 illustrates a graph of one embodiment of an energy profile for an alpha strike, while FIG. 4 illustrates a graph of one embodiment an energy profile for a typical neutron strike.

Since both logic arrays 210 and 220 are more sensitive to a particular type of strike, detector 150 may detect varying amounts alpha or neutron radiation, and thus alert to not only the relative strength of the source of radiation but also to its type. In one embodiment, the SER sensitive parts such as arrays 210 and 220 have large diffusion area exposure, but have low capacitance. In a further embodiment, arrays 210 and 220 include inverters and latches that are asymmetric in drive strengths to further be subject to either alpha or neutron strikes and to be more likely to flip from a given seeded logic state to its opposite.

In an alternative embodiment, a form of DRAM cell is a good candidate for radiation and SER detection. Therefore, logic arrays 210 and 220 may also be implemented as memory arrays. Further logic arrays 210 and 220 would include few transistors. No special trenches are needed because only parasitic diffusion capacitance is needed, and the refresh rate is controlled to act as a sensitivity control to alpha or neutron strike rates (while being refreshed the cell would tolerate a strike). In a further embodiment, a known fixed pattern is written into the arrays.

Detector 150 also includes SER immune components. Such components include input/output (I/O) logic 240, timers/control 250, control logic 260, read only memory (ROM) 270, random access memory (RAM) 275 and non-volatile memory 280. In one embodiment, on die shielding of the SER immune sections can limit alpha strikes, and careful logic design for the non-SER sensitive areas can limit both alpha and neutron upset to the control sections.

I/O logic is also included within detector 150. I/O logic is used to receive input data and to transmit output data. For example, the inputs may include an ON/OFF input and a sensitively selector that would just change the sampling rate of reading the arrays, or the refresh rate of the logic arrays. Likewise outputs may include a modulated audio tone or an LED/LCD display to show some relative dose rate.

Timers/control 250 control the rate at which logic arrays 210 and 220 are examined. Control logic 260 is implemented to analyze logic arrays 210 and 220 and to determine whether the arrays have been exposed to radiation. According to one embodiment, control logic 260 examines logic arrays 210 and 220 at intervals determined by control logic 260, as discussed above. Upon examination, control logic 260 compares the recently read known values to those previously stored and determines whether there is a match.

For the memory array embodiment, if there is not a match between the known values and the examined values, a time varying level of defective bit values are detected. The time varying level of defective bit values are proportional to the level of radiation upset. Similarly, for logic blocks dense logic structures are created that have fixed inputs. Because the design of the structures is known, the combinatorial outputs are also known. By periodically reading the output stages of the structure, a time varying level of defects caused by radiation-induced upset is detected.

According to one embodiment, control logic 260 is implemented as a CPU. However in other embodiments, control logic 260 is implemented as a very low power and small transistor microcontroller since control logic 260 does not need to operate very fast. ROM 270 stores a simple operating system and constants. In addition, RAM 275 is used to for the upset rate calculations.

Non-volatile memory 280 stores expected SER array signatures and the calibration results. For example, detector 150 is exposed to, and measures, a known rate source of upset prior to its use. In response, the amount of hits are detected and saved as a constant within detector 150. Device 150 may be calibrated by known alpha and neutron sources at assembly/test time of the final system.

In one embodiment, standard CMOS fabrication techniques are used for fabricating the electronic sections within detector 150. One side benefit of using standard CMOS logic processes is that the SER sensitive arrays, either logic or memory, can be mapped for defects at time of fabrication and such fabrication faults stored in the NV memory as areas to ignore or as the correct background signatures. The manufacturing yield of the device therefore would be much higher than normal semiconductor products, thus lowering the cost of the device even more than normal. No additional error correction circuits would be needed to the SER sensitive array sections.

Although detector 150 has been described as a separate device within computer system 100, all of the functions of the radiation detection technique can be integrated into CPU 102, chipset 107 or any other semiconductor device within computer system 100. In such an embodiment, the radiation sensitive logic arrays and/or memory arrays can be part of a larger die or system that uses radiation immune controller logic, either in a single die or a stacked die technique.

Moreover, detector 150 may be implemented as a stand-alone radiation detector separate from a computer system. Such a device is small and light, and operates on a single or double AA battery and last the shelf life of the battery the controller logic would be inactive since most of the time, and the other SER sections would be static and not clocked.

By using the solid-state approach described here, all of the limitations in the radiation detectors described above are overcome. The solid-state radiation detector can be produced at various sensitivities and feature sets with prices ten times less than previous models. The low cost of these solid-state versions, make such systems available to huge numbers of people not just scientists. Every police, fire, and emergency group could have (or wear) such a device. Homeowners could check for Radon in basements and other structures.

In addition, the SER application SER helps verify how and when a device should correct faulty data from an SER event. Such a feature could be used to help determine when to gracefully recover from an SER event that could not be on-board corrected.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. An apparatus comprising:
   a first integrated circuit (IC); and
   a second IC having:
      one or more logic components having a high soft error rate (SER) to detect radiation that could result in soft errors at logic at the first IC, including:
         a first soft error rate (SER) sensitive memory array to detect alpha particle strikes;
         second SER sensitive memory array to detect neutron particle strikes; and
      one or more SER immune components to analyze data received from the one or more logic components, including:
         a non-volatile memory to store expected SER data for the first and second memory arrays; and
         control logic to examine data received from the first and second memory arrays by comparing the received data to the expected data.

2. The apparatus of claim 1 wherein the first and second memory arrays include inverters and latches that are asymmetric in drive strengths.

3. The apparatus of claim 2 wherein a refresh rate of the first and second memory arrays are controlled to operate as a sensitivity control to alpha and neutron strikes.

4. The apparatus of claim 2 wherein the one of more SER immune components comprises;
   timers to control the rate at which the first and second memory arrays are examined.

5. The apparatus of claim 4 wherein the one or more SER immune components further comprises;
   input/output logic;
   a random acccss memory (RAM); and
   a read only memory (ROM).

6. A method comprising:
   detecting radiation at one or more logic components having a high soft error rate (SER) that could result in soft errors at logic at a first IC, by:
      detecting alpha particle strikes at a first soft error rate (SER) sensitive memory array; and
      detecting neutron particle strikes at a second SER sensitive memory array; and
   analyzing data at one or more SER immune components received from the one or more logic components, by:

storing expected SER data for the first and second memory arrays at a non-volatile memory; and examining data received from the first and second memory arrays at control logic by comparing the received data to the expected data.

7. A radiation detector comprising;

an integrated circuit (IC) having:
- one or more logic components having a high soft error rate (SER) to detect radiation, including:
  - a first soft error rate (SER) sensitive memory array to detect alpha particle strikes;
  - second SER sensitive memory array to detect neutron particle strikes; and
- one or more SER immune components to analyze data received from the one or more logic components, including:
  - a non-volatile memory to store expected SER data for the first and second memory arrays; and
  - control logic to examine data received from the first and second memory arrays by comparing the received data to the expected data.

8. The radiation detector of claim 7 wherein a refresh rate of the first and second memory arrays are controlled to operate as a sensitivity control to alpha and neutron strikes.

9. The radiation detector of claim 7 wherein the one or more SER immune components further comprise;
- timers to control the rate at which the first and second memory arrays are examined.

10. The radiation detector of claim 9 wherein the one or more SER immune components further comprises;
- input/output logic;
- a random access memory (RAM); and
- a read only memory (ROM).

11. A computer system comprising:
- a central processing unit (CPU); and
- a radiation detector coupled to the CPU, having:
  - one or more logic components having a high soft error rate (SER) to detect radiation, including:
    - a first soft error rate (SER) sensitive memory array to detect alpha particle strikes;
    - second SER sensitive memory array to detect neutron particle strikes; and
  - one or more SER immune components to analyze data received from the one or more logic components, including:
    - a non-volatile memory to store expected SER data for the first and second memory arrays; and
    - control logic to examine data received from the first and second memory arrays by comparing the received data to the expected data.

12. The computer system of claim 11 wherein the first and second memory arrays include inverters and latches that are asymmetric in drive strengths.

13. The computer system of claim 11 wherein the radiation detector further comprises;
- timers to control the rate at which the first and second memory arrays are examined.

* * * * *